൭,143,459
NONFOAMING WETTABLE POWDER
COMPOSITIONS
Alfred F. Marks, Norwalk, and Ilse B. Frederick, Glenbrook, Conn., assignors to American Cyanamid Company, New York, N.Y., a corporation of Maine
No Drawing. Filed Apr. 10, 1958, Ser. No. 727,545
8 Claims. (Cl. 167—42)

The present invention is concerned with nonfoaming wettable powder compositions containing active fungicides and to methods of preparing such compositions.

Many otherwise useful fungicidal compounds are hindered in their commercial development because of their inherent foaming characteristics. It is extremely difficult to prepare them in suitable dilution for spray application as aqueous solutions or emulsions. This objectionable characteristic is found, for example, in the alkylguanidine salt compounds which are of increasing interest in the control of fungus organisms on many different agricultural crops.

Typical of the latter class of compounds are those which can be designated by the general formula:

wherein R is an alkyl radical containing from 10 to 16 carbon atoms, $n$ may be one or two and X stands for a residue of an acid, organic or inorganic in nature, such as that of acetic, propionic, butyric, valeric, lauric, stearic, lactic, maleic, malic, phthalic, benzoic, boric, hydrochloric, sulfuric, phosphoric acid, and like monocarboxylic, dicarboxylic and mineral acids.

When attempts are made to prepare wettable powders in the usual manner, the resultant product, on attempted dilution, foams very badly. If this undesirable characteristic could be overcome, it would solve a serious problem in the art.

It would seem relatively simple to overcome this difficulty by the use of antifoaming agents. Unfortunately, the common antifoaming agents of the soluble salt or higher alcohol type are ineffective unless used in excessive amounts. Acid type agents such as oleic acid make the resultant composition and sprays prepared therefrom too phytotoxic for ordinary use. The petroleum distillate type of antifoaming agents also produces the same unfortunate result.

It is, therefore, a principal object of the present invention to devise a method of preparing a suitable wettable powder composition which can be readily dispersed in dilution suitable for agricultural sprays. At the same time, resultant spray should not be hampered by the excess foaming nor should it be phytotoxic.

According to the present invention, it has been found that when properly combined, a composition can be prepared containing a useful amount of the fungicide, useful diluent powders and satisfactory wetting and dispersing agents, by the use of certain types of antifoam, wetting and dispersing agents of limited selection. Typical fungicides with which the present invention is concerned are those guanidine salts discussed above of which for the purpose of this discussion dodecylguanidine acetate will be taken as illustrative. It is to be understood that the matters discussed in conjunction with the illustrations are applicable to the group of fungicides as a whole.

The nonfoaming wettable powder compositions of this invention contain by weight from about 10 to about 85 parts of an alkyl guanidine salt, from about 5 to about 90 parts of a dry inert powder carrier, from about 0.5 to about 10 parts of a wetting and dispersing surface-active agent, and from about 0.25 to about 5 parts of a silicone-based antifoam agent.

In accordance with the present invention, it has been found that only a surprisingly limited group of antifoaming agents are suitable. These are silicone-based antifoam agents, usually in the form of emulsions, several of which are commercially available, such as water-dispersible Antifoam A Emulsion of the Dow Corning Co., and Antifoam 60 of the General Electric Co.

Suitable wetting and dispersing surface-active agents for the compositions include sodium lauryl sulfonate, isopropylnaphthalene sodium sulfonate (Aerosol OS), dioctyl sodium sulfosuccinate (Aerosol OT), alkylated aryl polyether alcohol (Triton X100), modified phthalic glycerol alkyd resin (Triton B1956), salts of alkyl and aryl sulfonic acids (Daxad 21), polyoxyethylene tridecyl alcohol (Renex 30), and "Renex 30" plus urea (Renex 35).

Operable inert powder carriers include clays, talc, wood flour, activated carbon, pumice, silica, silicates, chalk and the like.

Having these materials available, it has been found that they must be combined in the proper manner in order to obtain optimum utility in the final composition. The procedure is as follows: an emulsion of a silicone-based antifoam agent is impregnated on a finely ground inert powder carrier to give a mixture containing from 10 to 25% of the antifoam emulsion. This preparation is then blended with a mixture consisting of the alkylguanidine salt, a surface-active agent and additional inert powder carrier to yield a mixture containing 10 to 85% of the alkylguanidine salt, 5 to 90% of the inert powder carrier, 0.5 to 10% of the surface-active agent and 0.25 to 5% of the antifoam agent. The final preparation is ground to an average particle size under 40 microns.

The compositions set forth in the following examples will further illustrate the invention but are not to be construed as limiting the same.

*Example 1*

| | Parts by weight |
|---|---|
| Dodecylguanidine acetate | 70 |
| Silicone-based antifoam agent | 2 |
| Dioctyl sodium sulfosuccinate (Aerosol OT) | 1 |
| Kaolinite clay | 27 |

*Example 2*

| | |
|---|---|
| Dodecylguanidine acid phthalate | 50 |
| Silicone-based antifoam agent | 1 |
| Dioctyl sodium sulfosuccinate (Aerosol OT) | 0.5 |
| Talc | 48.5 |

*Example 3*

| | |
|---|---|
| Dodecylguanidine borate | 45 |
| Silicone-based antifoam agent | 1 |
| Isopropylnaphthalene sodium sulfonate (Aerosol OS) | 1 |
| Attapulgite clay | 53 |

Example 4

| | |
|---|---|
| Bis(dodecylguanidine) malate | 60 |
| Silicone-based antifoam agent | 2 |
| Dioctyl sodium sulfosuccinate (Aerosol OT) | 2 |
| Kaolinite clay | 36 |

Example 5

| | Parts by weight |
|---|---|
| Dodecylguanidine acetate | 70 |
| Silicone-based antifoam agent | 2 |
| Polyoxyethylene tridecyl alcohol plus urea (Renex 35) | 3 |
| Kaolinite clay | 25 |

Example 6

| | |
|---|---|
| Tetradecylguanidine acetate | 40 |
| Silicone-based antifoam agent | 1 |
| Modified phthalic glycerol alkyd resin (Triton B1956) | 1 |
| Kaolinite clay | 58 |

Example 7

| | |
|---|---|
| Dodecylguanidine acetate | 35 |
| Silicone-based antifoam agent | 1 |
| Polyoxyethylene tridecyl alcohol (Renex 30) | 2 |
| Talc | 62 |

Example 8

| | |
|---|---|
| Hexadecylguanidine acetate | 50 |
| Silicone-based antifoam agent | 1.5 |
| Modified phthalic glycerol alkyd resin (Triton B1956) | 2 |
| Attapulgite clay | 46.5 |

Example 9

| | Parts by weight |
|---|---|
| Dodecylguanidine borate | 60 |
| Silicone-based antifoam agent | 2 |
| Modified phthalic glycerol alkyd resin (Triton B1956) | 2 |
| Alkylated aryl polyether alcohol (Triton X100) | 1 |
| Kaolinite clay | 35 |

Example 10

| | |
|---|---|
| Decylguanidine acetate | 50 |
| Silicone-based antifoam agent | 2 |
| Polyoxyethylene tridecyl alcohol plus urea (Renex 35) | 3 |
| Dioctyl sodium sulfosuccinate (Aerosol OT) | 0.5 |
| Talc | 44.5 |

Example 11

| | |
|---|---|
| Bis(dodecylguanidine) phthalate | 35 |
| Silicone-based antifoam agent | 1 |
| Polyoxyethylene tridecyl alcohol (Renex 30) | 2 |
| Isopropylnaphthalene sodium sulfonate (Aerosol OS) | 1 |
| Attapulgite clay | 61 |

Example 12

| | |
|---|---|
| Dodecylguanidine acetate | 70 |
| Silicone-based antifoam agent | 2 |
| Modified phthalic glycerol alkyd resin (Triton B1956) | 3 |
| Alkylated aryl polyether alcohol (Triton X100) | 0.5 |
| Kaolinite clay | 24.5 |

These and similar compositions were readily dispersed without excessive foaming in usual amounts of from 0.25 to 5 pounds of the composition per 100 gallons of water.

Logan black raspberry plants infected with the anthracnose fungus *Elsinoë veneta* were sprayed with an aqueous suspension containing two pounds of the wettable powder composition of Example 12 per 100 gallons of water. Two applications were made with a three week interval. Excellent control of the pathogen resulted with no phytotoxicity to the plant foliage.

Apple trees infected with the fungus organism *Gymnosporangium juniperi virginianae* were sprayed with an aqueous suspension containing one pound of the wettable powder composition of Example 12 per 100 gallons of water. Observations made 20 days later showed that the fungus organism had been effectively controlled with no injury to the tree foliage.

Cherry leaf spot, caused by the fungus *Coccomyces hiemalis*, was eradicated by sprays containing 1.5 pounds of the wettable powder composition of Example 12 in 100 gallons of water. Three applications were made at 14 day intervals. Observations were made 20 days after the last spray application. Trees receiving no fungicide were severly diseased. The sprayed trees were completely free of disease with no evidence of phytotoxicity.

We claim:

1. A method of preparing a nonfoaming wettable powder composition which comprises: impregnating an emulsion of a silicone-based, water-dispersible antifoam agent on a finely ground inert powder carrier to give a mixture containing from 10 to 25% of the antifoam emulsion; blending the resultant mixture with a mixture consisting of additional inert powder carrier, a wetting and dispersing surface-active agent, and an alkyl guanidine salt of the formula:

$$(H_2N-\overset{\overset{NH}{\|}}{C}-NHR)_n.X$$

wherein R is alkyl containing from 10 to 16 carbon atoms, *n* is an integer selected from one and two, and X stands for an acid residue, of a member selected from the group consisting of monocarboxylic acid, hydrochloric acid, sulfuric acid and phosphloric acid.

2. A method according to claim 1 wherein said alkyl guanidine salt is an acid salt of dodecylguanidine.

3. A nonfoaming wettable powder composition consisting essentially of by weight from about 5 to about 90 parts of a dry inert powder carrier, from about 0.5 to about 10 parts of a wetting and dispersing surface-active agent, from about 0.25 to about 5 parts of a silicon-based, water-dispersable antifoam agent, and from about 10 to about 85 parts of an alkylguanidine salt of the formula:

$$(H_2N-\overset{\overset{NH}{\|}}{C}-NHR)_n.X$$

wherein R is alkyl containing from 10 to 16 carbon atoms, *n* is an integer selected from one and two, and X stands for an acid residue of a member selected from the group consisting of monocarboxylic acid, hydrochloric acid, sulfuric acid and phosphoric acid, said powder having been prepared by the method of claim 1.

4. A composition according to claim 3 wherein said salt of dodecylguanidine is dodecylguanidine acetate.

5. A composition according to claim 3 wherein the alkyl guanidine salt is that of dodecylguanidine.

6. A composition according to claim 3 wherein the alkyl guanidine salt is the hydrochloric acid salt of dodecylguanidine.

7. A composition according to claim 3 wherein the alkyl guanidine salt is the sulfuric acid salt of dodecylguanidine.

8. A composition according to claim 3 wherein the alkyl guanidine salt is the phosphoric acid salt of dodecylguanidine.

References Cited in the file of this patent

UNITED STATES PATENTS

| | | |
|---|---|---|
| 2,110,943 | Remensnyder | Mar. 15, 1938 |
| 2,213,474 | Puetzer | Sept. 3, 1940 |
| 2,289,541 | Ericks et al. | July 14, 1942 |

(Other references on following page)

UNITED STATES PATENTS

| | | |
|---|---|---|
| 2,336,605 | Ernsberger et al. | Dec. 14, 1943 |
| 2,867,562 | Lamb | Jan. 6, 1959 |
| 2,921,881 | Lamb | Jan. 19, 1960 |

FOREIGN PATENTS

| | | |
|---|---|---|
| 162,857 | Australia | May 16, 1955 |
| 166,383 | Australia | Dec. 22, 1955 |
| 727,285 | Great Britain | Mar. 30, 1955 |
| 727,310 | Great Britain | Mar. 30, 1955 |
| 750,501 | Great Britain | June 20, 1956 |

OTHER REFERENCES

Hackh's Chemical Dictionary, 1944, The Blakiston Company, pages 68, 282.

Frear: A Catalogue of Insecticides and Fungicides, Chronica Botanica Comp., vol. 1, page 147 (1947).

Frobisher: Fundamentals of Microbiology, W. B. Saunders, 1953, page 3.

King: U.S.D.A., Agriculture Handbook No. 69, May 1954, p. 184.

McGregor: "Silicones and Their Uses," McGraw-Hill Book Co., Inc., N.Y., 1954, pp. 74 and 75.